US007616524B1

United States Patent
Gersztenkorn

(10) Patent No.: US 7,616,524 B1
(45) Date of Patent: Nov. 10, 2009

(54) WAVELET BASED INTERCEPT ATTRIBUTE FOR SEISMIC EXPLORATION

(75) Inventor: Adam Gersztenkorn, Sugar Land, TX (US)

(73) Assignees: The University of Tulsa, Tulsa, OK (US); Fairfield Industries, Incorporated, Sugar Land, TX (US)

( * ) Notice: Subject to any disclaimer, the term of this patent is extended or adjusted under 35 U.S.C. 154(b) by 0 days.

(21) Appl. No.: 11/895,709

(22) Filed: Aug. 27, 2007

Related U.S. Application Data

(60) Provisional application No. 60/840,302, filed on Aug. 25, 2006.

(51) Int. Cl.
*G01V 1/00* (2006.01)
(52) U.S. Cl. .......................................... 367/38; 702/17
(58) Field of Classification Search .................. 367/25, 367/26, 27, 31, 32, 40, 41, 42, 38; 702/17
See application file for complete search history.

(56) References Cited

U.S. PATENT DOCUMENTS

| | | | | |
|---|---|---|---|---|
| 3,714,566 A | * | 1/1973 | Kang | 324/76.22 |
| 6,745,129 B1 | * | 6/2004 | Li et al. | 702/17 |
| 7,079,984 B2 | * | 7/2006 | Eryurek et al. | 702/185 |
| 2005/0043598 A1 | * | 2/2005 | Goode et al. | 600/316 |
| 2006/0109941 A1 | * | 5/2006 | Keele, Jr. | 375/350 |
| 2006/0215783 A1 | * | 9/2006 | Shako et al. | 375/296 |

OTHER PUBLICATIONS

Rao, Y. and Murthy, C., "Comparative Analysis of Spectral, Empirical Orthogonal Function, and Wavelet Decompositions for an Upwelling Event," Apr. 2001, vol. 18, Issue 4; http://ams.allenpress.com/perlserv/?request=get-document&doi=10.1175%2F1520-0426(2001)018%3C0704%3ACAOSEO%3E2.0.CO%bB2.*

* cited by examiner

*Primary Examiner*—Eric Bolda
*Assistant Examiner*—Krystine Saito
(74) *Attorney, Agent, or Firm*—Head, Johnson & Kachigian, P.C.

(57) ABSTRACT

A wavelet-based method for improving the quality of seismic data utilizing the intercept determined by applying least squares regression to the wavelet transform of a seismic trace. The intercept is calculated for every time point of the wavelet transform for each seismic trace. The intercepts are then plotted versus time or depth. These plots are used in place of seismic traces themselves to create two dimensional and three dimensional seismic section images. In one embodiment, the real and imaginary portions of the selected wavelet transform are weighted to generate a finer representation of the intercept. In another embodiment, a minimum amplitude value is utilized to establish a noise floor, thus stabilizing the regression calculation. In yet another embodiment, a taper of the amplitude is applied to wavelet enhance the resolving power of the wavelet.

26 Claims, 18 Drawing Sheets

WAVELET BASED INTERCEPT ATTRIBUTE FOR SEISMIC EXPLORATION

The present application claims priority to U.S. Provisional Application Ser. No. 60/840,302, filed on Aug. 25, 2006.

BACKGROUND OF THE INVENTION

1. Field of the Invention

The present invention relates generally to the field of seismic exploration and more particularly to methods of processing 2-D and 3-D seismic data. More particularly the present invention relates to a new seismic attribute for seismic trace analysis. Most particularly, the method of the invention uses wavelet transforms to determine statistical parameters to analyze the structure and stratigraphy shown on seismic sections.

2. Description of the Prior Art

In the oil and gas industry, seismic prospecting techniques are commonly used to aid in the search for and evaluation of subterranean hydrocarbon deposits. Typically, the goal of seismic prospecting is to construct a two dimensional (2D) or three dimensional (3D) representation of subsurface lithological formations in order to identify features that are indicative of hydrocarbon accumulations. Seismic prospecting generally consists of three separate stages: data acquisition, data processing and data interpretation. The success of a seismic prospecting operation depends on the satisfactory conclusion of all these stages.

In the first stage of seismic prospecting, namely seismic acquisition, a seismic source, such as, for example, dynamite, is used to generate a downgoing seismic wave field or signal that propagates into the earth and is partially reflected by subsurface seismic reflectors, i.e. interfaces between subsurface lithologic or fluid units that have different elastic properties. The reflected or upgoing wavefield or signals, known as seismic reflections, are detected by seismic receivers located at or near the surface of the Earth, at or near the water surface, or at or near the seafloor. The detected signals are converted into electric signals and are recorded, thereby generating a seismic survey of the subsurface.

In a 2D seismic survey the recording locations are generally laid out in a single straight line, whereas in a three dimensional (3D) survey the recordings are distributed across the surface in a grid pattern. In simplest terms a 2D seismic line can be thought of as giving a cross sectional picture of the earth layers as they exist below the approximate center point between the shot and receiver locations for geology without much distortion. In an area of complex geology the data may not come from the approximate center point. A 3D survey creates a data cube or volume that is a 3D representation of the subsurface. In either case the recorded signals or seismic energy data can then be processed to yield information relating to the subsurface formations identifying such structures as subsurface formation boundaries. The seismic energy recorded by each seismic receiver for each source activation during the data acquisition stage is known as a "trace".

The seismic receivers utilized in such operations typically include pressure sensors, such as hydrophones, and velocity sensors such as geophones. Utilizing a dual sensor configuration, namely the combination of a geophone and hydrophone, various summation techniques of the two types of wavefield recordings can be utilized to improve the accuracy of a trace. A modern seismic trace is a digital recording of the energy reflecting back from inhomogenities or reflectors in the subsurface. Thus each digital sample in a seismic trace is associated with a travel time or depth and in the case of reflected energy a two-way travel time or depth from the surface to the reflector and back to the surface again. Further the surface location of every trace is carefully recorded. This allows the seismic information contained within the traces to be later correlated with specific subsurface locations. This provides a means for posting and contouring seismic data and the attributes extracted from the data on a 2D or 3D map.

Once the seismic trace has been acquired, it is then processed during the second stage of seismic prospecting. Seismic processing may involve various techniques to improve the signal to noise ratio, shape the wavelet through deconvolution, gaining the data to reduce the effects of spherical divergence and attenuation, properly positioning the reflected energy by migration, etc. Seismic processing typically involves the use of various mathematical algorithms that are applied to the data to enhance its signal content and to render the data more amenable to interpretation.

One of the main objectives of the data processing stage is to remove, or at least attenuate, unwanted recorded energy, or "noise", that contaminates the primary seismic signal. Those skilled in the art understand that there are many ways to improve the signal to noise ratio of the seismic data. For example, frequency-wavenumber (F-K) filtering can be used to filter organized noise. Radon transforms can be used to attenuate unwanted multiple energy, i.e., energy that has traveled more than one path in the subsurface. Random noise also can be attenuated by such processes as diversity filtering, Fourier filtering, Karhunen-Loeve transforms, etc. Deconvolution can eliminate reverberations and can increase the resolution of the wavelet. Spiking deconvolution attempts to collapse the seismic wavelet into a spike. Predictive deconvolution permits a certain portion of the wavelet pass without deconvolution, i.e. the lag, but then deconvolves a time window outside of this lag. This predictive deconvolution is generally a milder form of deconvolution but can, with a suitable choice of parameters, be the equivalent of spiking deconvolution.

Likewise, a gain function may be applied to the seismic trace. As a seismic wave travels through the earth, it loses amplitude by two main means: spherical divergence and attenuation. Spherical divergence is caused by the spreading of energy over a larger area as the wave expands. Attenuation is created by the wave moving pore fluids or generating heat as, for example, in the rock matrix. Both these processes can be ameliorated by applying a gain function to the seismic trace. This raises the amplitude of the trace at later times. There are several forms the gain function may take, e.g. $t^n$ where n is a user supplied parameter, db per second, etc. The purpose of these corrections is to apply an increase of amplitude with time or depth.

Another method for attenuating unwanted noise components in seismic data traces is through the common-midpoint (CMP) "stacking" process. According to the CMP method, recorded seismic data traces are sorted into common-midpoint groups, called CMP gathers, each of which contains a number of different seismic data traces having the same midpoint but different source-to-receiver offset distances. CMP gathers for a particular point are summed or "stacked" together yielding a single stacked data trace for the point, this trace being a composite of the individual seismic data traces in the CMP gather. Through stacking of CMP traces, the unwanted energy on any one trace is reduced when the trace is added with other CMP traces, such that the desired energy is enhanced. Typically, the stacked data trace has a significantly improved signal-to-noise ratio compared to that of the unstacked seismic data traces.

Prior to creation of a final stack from processed unstacked CMP data, the data must have normal moveout correction (NMO) applied. In NMO correction the CMP data is flattened, i.e. the different reflectors are aligned in time or depth across the unstacked CMP. The standard formula used to do this is $$T_x^2 = T_0^2 + x^2/v^2$$

or $$T_0^2 = T_x^2 - x^2/v^2$$

which is the equation for NMO out to the second order. This equation can have further orders such as x4, x6, etc. Most commonly, however, terms on the order of x4 or less are utilized. In the formula above, $T_0$ is the time at zero offset of a reflector, $T_x$ is the time at offset x, "x" is the shot to receiver distance and "v" is the velocity of the medium. In applying the NMO equation, the term $x^2/v^2$ term or higher order terms are subtracted from the equation to bring all the data back to a constant $T_0$. The velocity is very important in this determination because the reflectors have to be aligned correctly for the stacking process. The stacking process essentially sums across the CMP gathers. That is, the flat lying reflectors after NMO correction are summed across all the offsets, the distance between shot and geophone. This creates a stacked section, i.e. one trace at each CMP location.

Stacking after NMO need not be the final step in seismic data processing. Additional procedures can be applied to the data in the stack format. Such processes include post-stack deconvolution, post-stack migration, gaining of the data, signal enhancement, etc.

In any event, the foregoing prestack and poststack processes are generally utilized to make the lithologic subsurface section or volume more amenable for interpretation.

To properly position the seismic data for processing, seismic migration is used. Seismic migration moves the unmigrated traces to their correct location or as near the correct location as the particular algorithm permits. Migration improves the seismic data by improving the lateral positioning of seismic reflectors with dip, i.e. reflectors at an angle, the dip, in the subsurface. Migration will move the data updip and will shorten the reflection. Migration also collapses the diffraction hyperbolas to a point such as the beginning of a fault plane. Migration can be prestack or poststack. Prestack migration is preferred but is more expensive as each trace at a CMP, for example, will be migrated. There is also a distinction between time and depth migration. If the subsurface comprises severe velocity changes the more complicated algorithms of depth migration are needed. Prestack and poststack depth migrations will be more expensive than the corresponding time algorithms but in some cases will have to be used.

The final phase of seismic exploration is interpretation. Interpretation uses the seismic section or volume to make an estimation of the subsurface, both structurally and stratigraphically, by identifying reflective surfaces in the subsurface, e.g. reflectors and faults. The resulting form of the subsurface may be used to identify the location of possible hydrocarbon accumulations. This process is referred to as "structural interpretation." Similarly, a change in the characteristics of a reflector, such as amplitude or phasing, may be indicative of stratigraphic hydrocarbon traps. Most of the interpretations at this time use both poststack and prestack attributes. Amplitudes in poststack or prestack data can be very important as high reflectivity values can be indicative of gas concentrations or oil with a high gas charge. Instantaneous frequency or Fourier analysis can be important because frequency "shadows" sometimes exist under hydrocarbon concentrations. Instantaneous phase can be important as it enhances the continuity of reflectors. Instantaneous amplitude can be important for the change of amplitude with hydrocarbon concentrations.

There are many seismic attributes which can be derived from the data, rendering the data more amenable for interpretation, such as, for example, instantaneous phase, instantaneous frequency, instantaneous amplitude or coherency. Instantaneous attributes are most commonly determined utilizing complex trace creation and analysis. Coherency utilizes cross-correlation between traces. None of the foregoing utilize wavelet transform. Seismic attributes are also derived from prestack data as well. Amplitude Variation with Offset (AVO) attributes illustrate how the amplitude of a particular reflector changes as the offset, i.e., the distance between shot and receiver, changes. There are several AVO attributes, such as gradient, intercept, fluid factor, etc.

Notwithstanding the foregoing, it is well known in the art to apply Fourier transforms to seismic traces in order to identify and filter noise in the traces. It is also known to use an outgrowth of Fourier transforms, namely wavelet transforms, to localize and scale seismic traces to render clearer images of the subsurface structure and stratigraphy with which they are associated.

One method of the prior art utilizes wavelet transforms in combination with the calculation of the Hölder exponent to analyze seismic data. Seismic traces are transformed by means of a wavelet transform where the wavelet used is a Morlet wavelet. From this wavelet transform, the Hölder exponents can be derived. The Holder exponent measures the regularity of seismic trace data by measuring the growth or decay of wavelet transform amplitude across a range of scales for each time point in the data. By definition the Holder exponent is the slope, gradient, of a least squares linear regression on the log-log plot of wavelet transform amplitude vs. scale for every time point.

One drawback to utilization of the Hölder exponent is that the Hölder exponent is subject to noise and thus, can prove to be unstable, or have significant variance. In other words, seismic data with noise can have a large negative impact on an attribute which is based on the slope or gradient of the wavelet transform.

Thus, it would be desirable to provide a seismic attribute for seismic trace analysis that is highly localized, yet that has a high degree of stability with respect to noise.

SUMMARY OF THE INVENTION

The present invention provides a method for improving the quality of seismic data, especially stratigraphic and structural representations of the subsurface. This is accomplished using the wavelet transform. Wavelet transforms are well known in the geophysical industry and there are many wavelets that can be used, e.g. Paul, Morlet, etc. Within the present invention, the Morlet wavelet is used because of its similarity to the seismic waveform. For each trace, at each desired time or depth sample, wavelet decomposition is determined. Each wavelet will have a scale parameter which, for the Morlet wavelet, controls how quickly the wavelet oscillates and the length in time of the wavelet. A wavelet will have a particular shape, for example, the Morlet wavelet, which is a Gaussian weight on a sinusoid. The shape will remain constant across the different scales but the duration of the particular shape will change with scale. Coarse scale values will generate a longer wavelet in time or depth while fine scale values will generate a shorter wavelet in time or depth. The wavelet transform amplitude spectrum yields the similarity of the wavelet with a particular scale to the seismic trace on a time or depth sample by time or depth sample basis using convolution as the measure of similarity.

Once the wavelet transform amplitude spectrum has been calculated, a plot of the log scale versus log wavelet transform amplitude spectrum is created. An intercept and gradient are calculated from the plot using a least squares linear fit over a range of scale values determined to be the most representative of the seismic data spectrum. This intercept is the output sample for a trace at that particular time or depth. The collection of all such outputs gives the transformed trace.

In another embodiment of the invention, the amplitude of the trace is fine tuned by convolving the trace with weighted real and imaginary parts to obtain an estimate of the degree of similarity of the trace with the complex Morlet wavelet at a particular scale. This is in contrast to the prior art where the real and imaginary components are weighted equally.

In still yet another embodiment of the invention, a noise floor is placed on the wavelet transform amplitude spectrum to avoid instability in the output data as the plot approaches zero.

DESCRIPTION OF THE PREFERRED EMBODIMENT

In the present invention, seismic trace data are analyzed by applying a wavelet transform and a subsequent calculation of the intercept in order to improve imaging and the information obtained from the seismic traces. Rather than attempting to reduce the noise of the seismic trace itself, a new attribute is calculated from the seismic trace data in order to facilitate geological interpretation of seismic data. This attribute is used in place of the seismic trace in preparing seismic images. Instead of using the trace itself, values calculated from transformed traces are graphed relative to time or depth.

Figure 1:
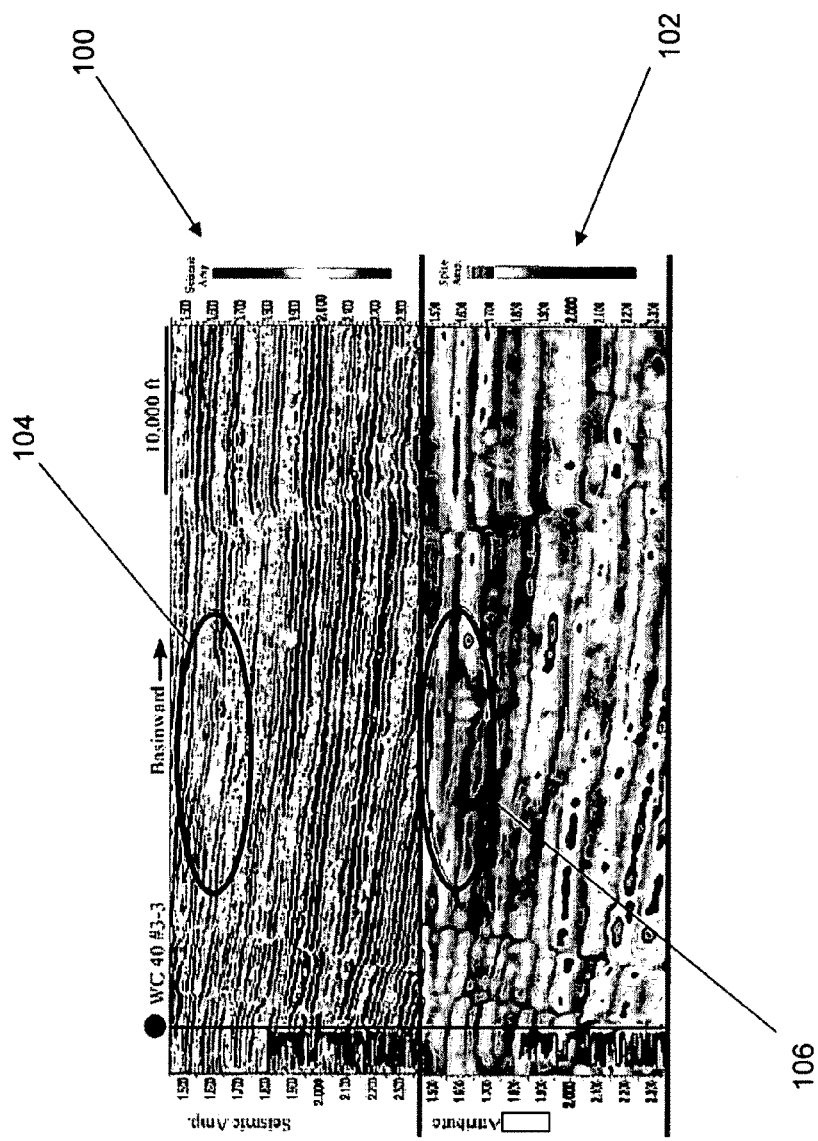
FIG. 1 provides a comparison between an ordinary seismic section and a seismic section derived utilizing the invention.

FIG. 1 is a comparison between an ordinary seismic section 100 in which standard noise reduction techniques were applied to seismic traces and a seismic section 102 generated from transform traces. Specifically shown in the seismic sections is a channel cut in the stratigraphy. In the ordinary seismic section 100, the channel cut is inside the marked area 104, while in the seismic section generated with the method of the invention, the channel cut is inside marked area 106. As is evident, section 102 has a much more well-defined delineation of the channel cut when compared to section 100.

Wavelet transforms are similar to Fourier transforms (FT) in that both seek a different representation of the original data in a transformed domain. FT works well for periodic and stationary signals where time information is not important. For non-stationary signals, FT is inappropriate because it can not express how a signal varies with the time. To study both time or depth and frequency information, various forms of the FT, such as windowed Fourier transform (WFT) or very short time Fourier transform (VSTFT), segment the signal and then applies FT for each segment. The size of each segment or "window" remains constant. However, this can lead to problems with accuracy for different frequencies.

One drawback to WFT is rooted in the Heisenberg uncertainty principle. This principle states that one cannot know exactly the time-frequency representation of a signal. In other words, one cannot know the exact frequency component at an instant time or depth. A smaller window gives better time or depth resolution, but poor frequency resolution; a larger window is not localized in time or depth, but has better frequency resolution. The wavelet transform (WT) overcomes these deficiencies by using windows that vary over a wavelet "scale" range. The "scale" of a wavelet is analogous to the frequency of a seismic trace.

WT analyzes seismic data with a series of scaled wavelets instead of seismic traces. Here the widths of the windows are changed by stretching or squeezing a constant number of oscillations (wavelet). This is fundamentally different from the practice in WFT, which uses a window of constant size and fills it with oscillations of different frequencies.

There are many different wavelet families. Different families make trade-offs between how compactly they are localized in space and how smooth they are. Some examples are the Ricker wavelet, the Morlet wavelet, the Harr wavelet and the Daubechies wavelet. Those skilled in the art will appreciate that each wavelet has parameters that may be altered to stretch or compress the wavelet as desired. Those skilled in the art will also appreciate that these are only a few of existing wavelets that are suitable for use in the present invention. It will also be obvious to those skilled in the art that new wavelets suitable for use in the present invention are constantly being created and that developing new wavelets is possible. Any wavelet may be used in the present invention. However, different wavelets will produce better results, depending on the nature of the seismic trace data.

Figure 2:
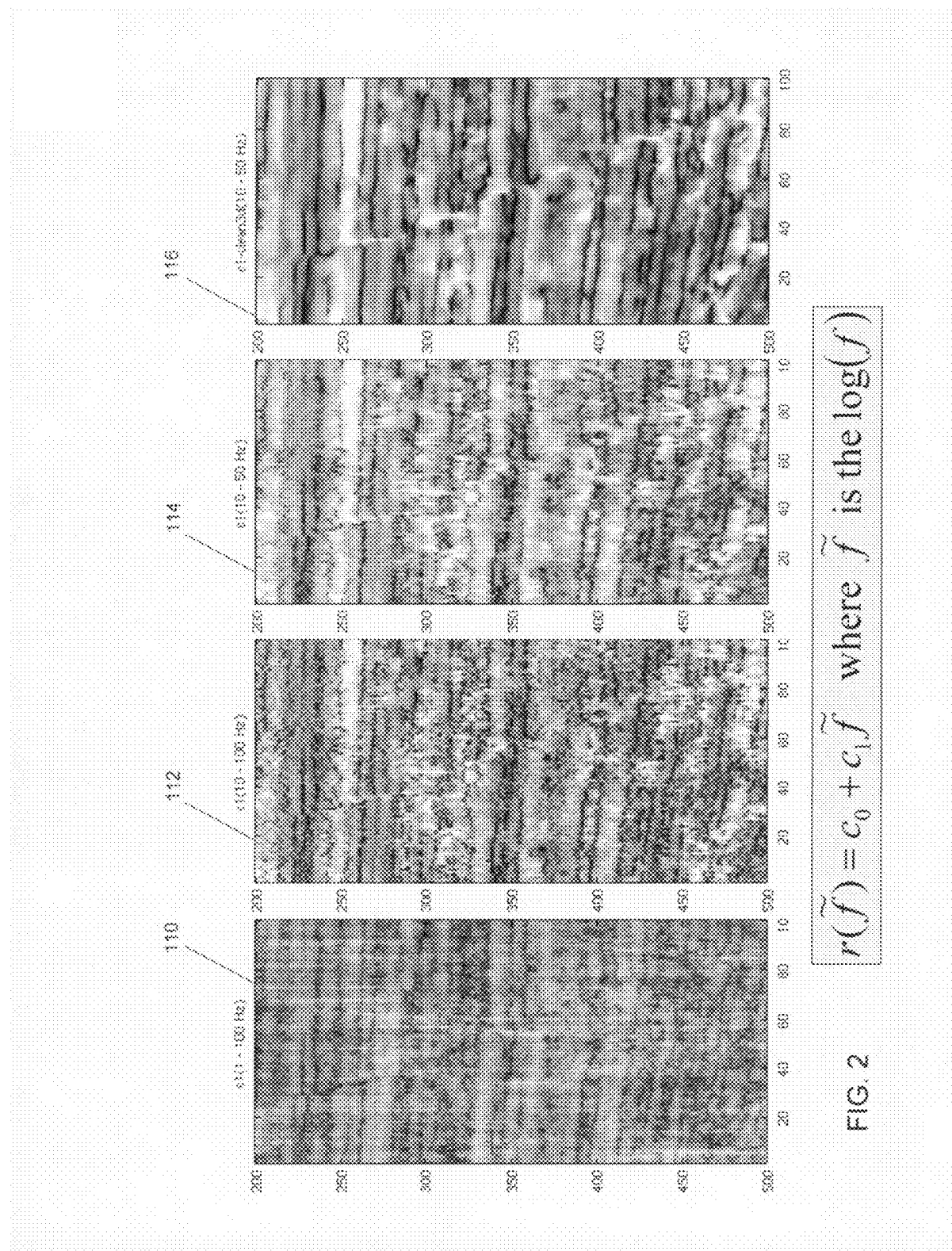
FIG. 2 illustrates seismic sections derived from the prior art wavelet transform method using the Holder exponent.
Figure 3:
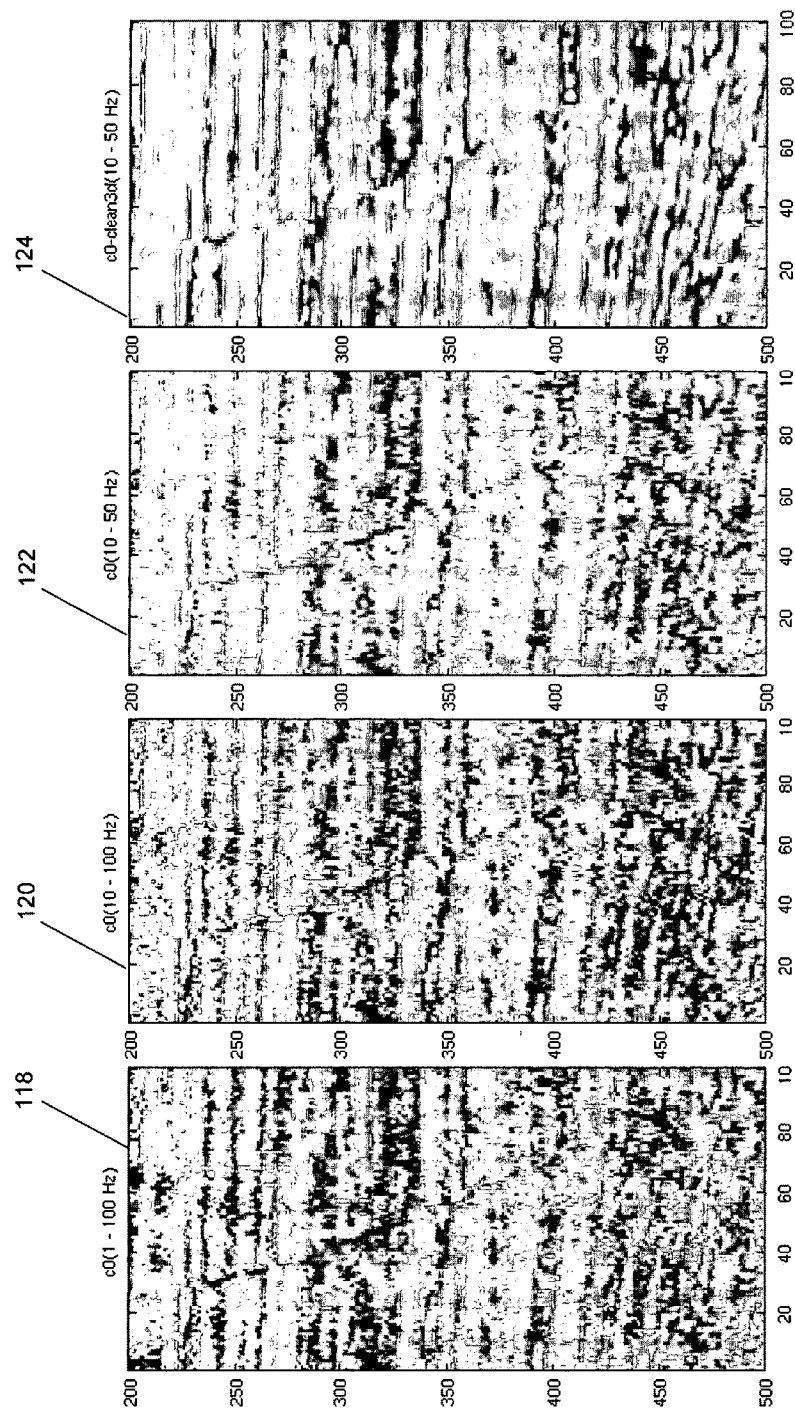
FIG. 3 illustrates seismic sections derived from the wavelet transform method of the invention using the intercept.
Figure 11:
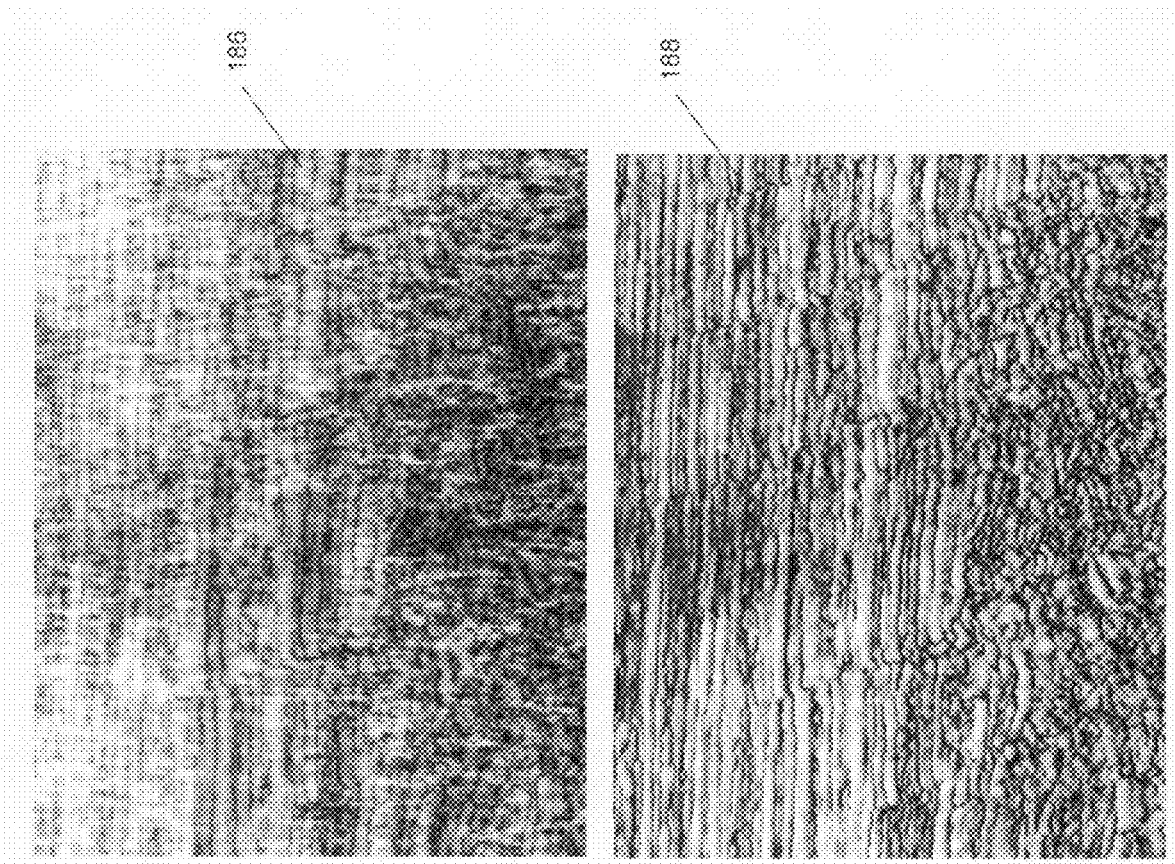
FIG. 11 is a comparison of seismic sections generated utilizing the prior art attribute and the attribute of the invention.

The intercept is capable of detecting detailed changes in the seismic data without being subject to the instability of prior art attributes such as the Hölder exponent. While the intercept and the Hölder exponent are both measures on the degree of seismic change in the data and allow analysis of seismic information in the data at every time point for practical applications, the Hölder exponent can vary significantly over the log scale range, resulting in instability. FIG. 11 illustrates the difference between a seismic section 186 generated utilizing the Hölder exponent prior art method and a seismic section 188 generated utilizing an intercept. As shown, the intercept method yields a much more defined seismic section. The instability associated with the Hölder exponent also can be seen in the Hölder exponent (c1) seismic images of FIG. 2 over a range of scales in comparison to the intercept seismic (c0) images of FIG. 3. FIGS. 2 and 3 illustrate the difference between the Hölder exponent and the intercept. Their wavelet ranges are identical but the intercept sections show the better image. The intercept remains substantially stable even as the Hölder exponent varies widely. Clearly, the intercept provides an attribute that is much more preferable for analysis of information, as well as extracting more accurate geological information within important boundaries, thereby enhancing detailed 2D, 3D and 4D interpretation.

One algorithm for estimating the intercept is briefly outlined as the following:

1. Study the behavior of the spectral range of the data, and choose the appropriate range of scales for least-square linear regression on CWT coefficients. Preferably, coefficients from the extremes or outliers of the range are left out and hence restricted from the least squares linear regression. Very fine scales are avoided to remove noise effects, while coarser scales are avoided because of the lack of information in these scales.

2. Perform continuous wavelet transform (CWT) with an appropriate family of wavelets. This will create at each time or depth sample and each trace the wavelet transform values. While different wavelets may be used, in the preferred embodiment, the complex Morlet wavelet is selected because it is a sine/cosine function multiplied by a Gaussian weighting and thus has similarity to the seismic waveform. A Morlet wavelet is a complex sine/cosine function modulated by a classical Gaussian bell function.

3. Determine the intercept of the straight lines in the log-log space of scales and respective CWT coefficients. This intercept is the output sample for the trace at that particular time or depth. The intercept is the point where the least squares regression line intercepts the log amplitude axis of the log log space. The least squares operation is performed numerically on the wavelet amplitude values.

This intercept is associated with a time or depth point on the seismic trace, and all such intercepts for a given trace are output as an intercept trace.

Figure 4:
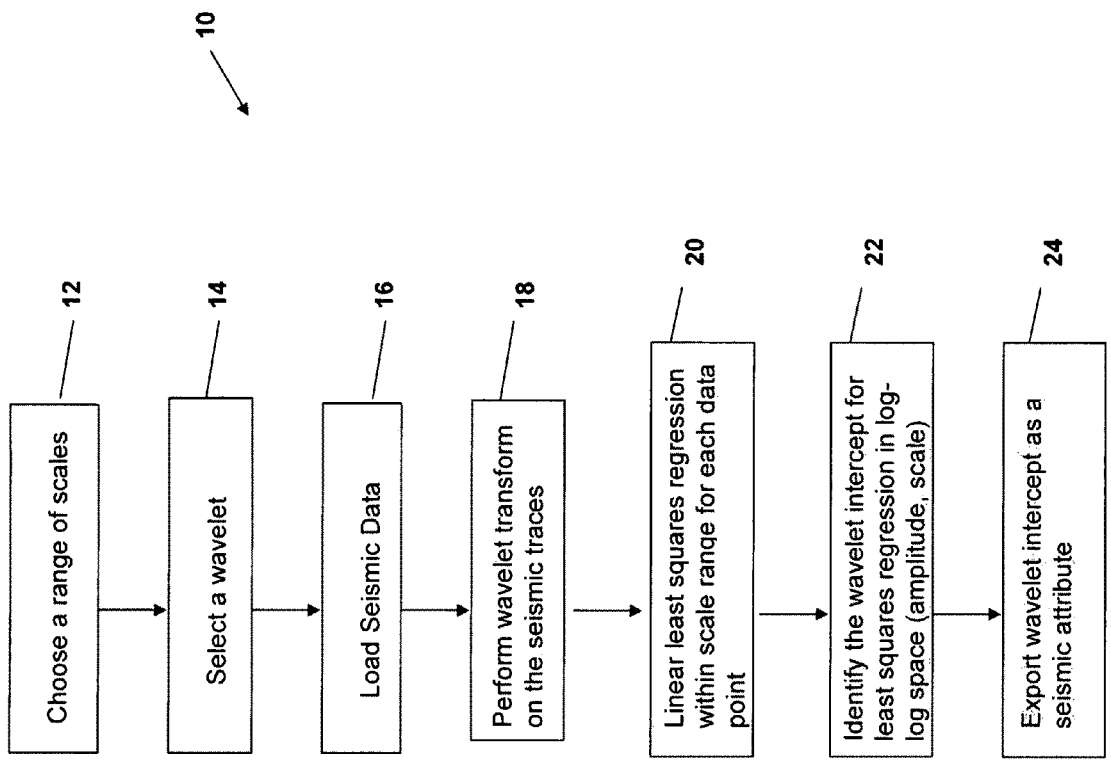
FIG. 4 shows a flowchart of the algorithm of the present invention.

FIG. 4 is a flowchart illustrating the above algorithm. Flowchart 10 expands the above algorithm into seven steps.

The first step 12 is to analyze the seismic data to select a range of scales, i.e., frequencies, for the log-log graph. Those skilled in the art will appreciate that the frequency range can be determined by any number of methods, such as filter tests. It is important to find the range of scales that will correspond to the data range of scales prior to performing a linear regression.

The next step 14 is to choose an appropriate wavelet. As stated above, the Morlet wavelet is preferable for this type of analysis because of its similarity to seismic waves. However, other wavelets may also be used. Once the wavelet is chosen, in step 16, the seismic data is loaded into a computer program capable of applying a wavelet transform to the data. Next, a continuous wavelet transform is performed on the seismic trace data over the selected range of scales. This is shown as step 18.

Following step 18, in step 20 linear regression is performed across the range.

The intercept of the linear regression line in the log-log space for the range of scales is determined during the sixth step 22.

Finally, in the seventh step 24, the intercept is exported as a seismic attribute so that it can be used to graph structural and stratigraphic information.

A range of scales is used to restrict the linear regression to a band of data with a high signal-to-noise ratio. More desirable results are achieved with data that is not contaminated with high amounts of noise. Those skilled in the art will appreciate that there are many different methods to determine the zone of high signal to noise. For example, filter tests are valuable to show frequency bands of good signal to noise. The main purpose of these tests is to identify a band, such as 10-50 Hz, where regression can have the most positive results because of the relative absence of noise.

Once the intercepts have been determined for each time or depth point from the log-log plots, they may be graphed as intercept versus time or depth. This is the intercept trace. The collection of all such outputs gives the transformed trace. Standard image display techniques typically used on seismic traces are then applied to these intercept traces to yield a seismic image. The result is an intercept trace section or volume in which stratigraphic boundaries and geophysical properties are more clearly shown than from general seismic traces.

In one preferred embodiment, the imaginary and real parts of the wavelet transform are each assigned a different weight or value "a" (see Formula 2 below) in order to generate a finer representation of the intercept. In the methods of the prior art where a Hölder exponent has been calculated, these real and imaginary parts of the wavelet transform have been equally weighted. It has been found that by weighting one part (real or imaginary) of the wavelet transform more than the other, the intercept trace has a finer representation. Hence, heretofore undetectable information in the seismic trace is revealed. In contrast, equally weighted parts yield a much coarser intercept trace. It should be noted that the particular component assigned the greater weight does not appear to be of as great of significance. The key is that they are simply weighted differently so that the amplitude of one of the parts is more pronounced in the resulting amplitude.

In another preferred embodiment, a minimum amplitude value is utilized to establish a noise floor, thus stabilizing the regression calculation. In the prior art method utilized in association with the determination of a Hölder exponent, no such floor was utilized. This resulted in instability of the data as the amplitude approached zero. Those skilled in the art will appreciate that as the wavelet transform (or the intercept) approaches zero on a log plot, the log of a small number is essentially log(0), which is an undefined number. In other words, this becomes a divide by a very small number problem in the determination of the Hölder exponent. Values of the wavelet transform smaller than the noise floor can be reset to a user defined value. Thus, in the present invention the floor is picked as a percentage of the absolute value of the input data.

Figure 6:
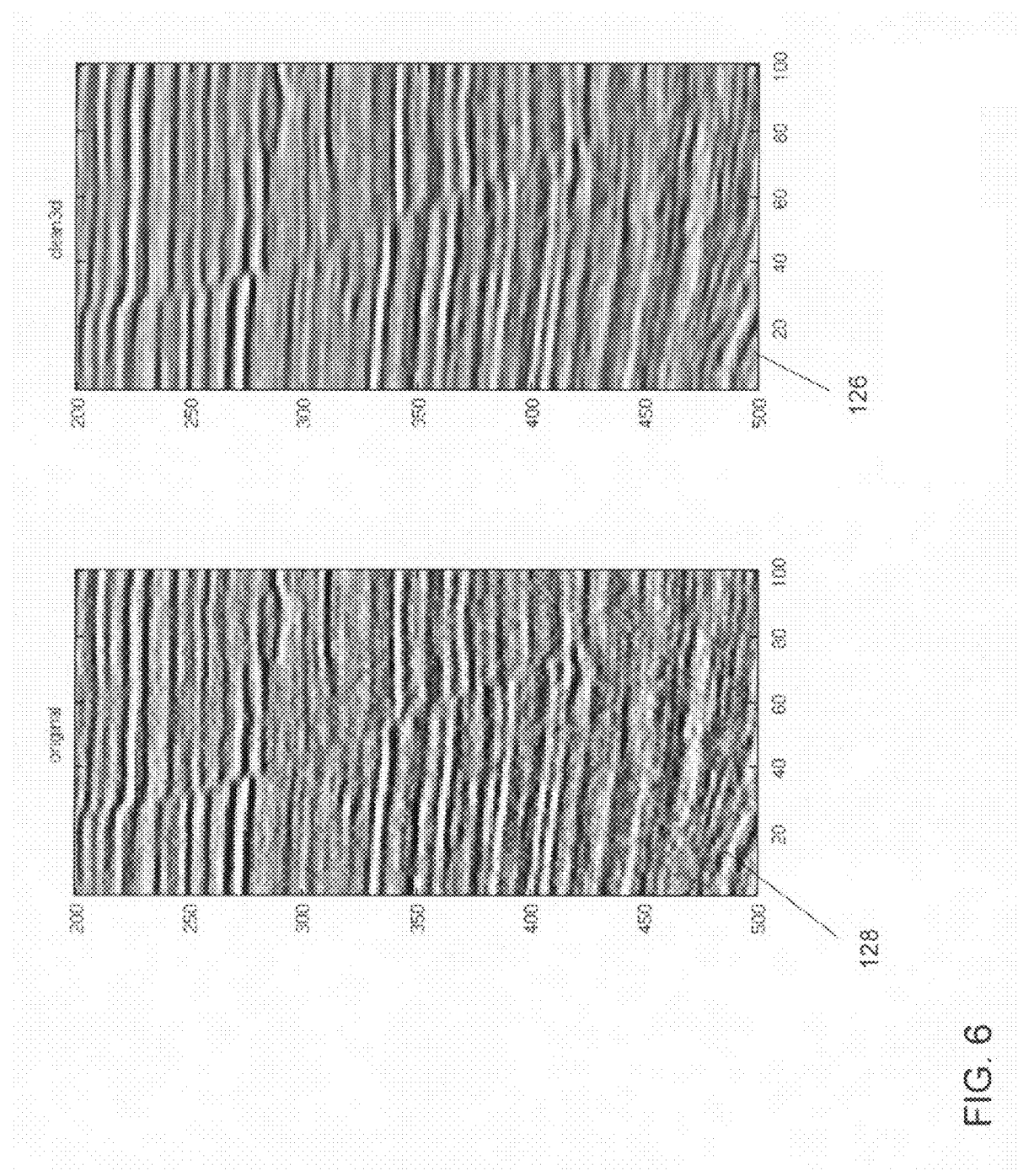
FIG. 6 illustrates the effects of pre-processing on seismic sections.

Those skilled in the art will appreciate that the method of the invention is sensitive to noise. The effects of noise on a seismic section are illustrated in FIGS. 2 and 3. In FIG. 2, section 114, a seismic section generated using the Holder exponent is illustrated in which the seismic data was not first subject to noise reduction. In section 116, the same seismic data is shown but in this case, noise reduction techniques were applied prior to wavelet transform. Likewise, in FIG. 3, section 122, a seismic section generated using the intercept of the invention is illustrated in which the seismic data was not first subject to noise reduction. In section 124, the same seismic data is shown but in this case, noise reduction techniques were applied prior to wavelet transform. In both cases, noise attenuation prior to application of the wavelet transform has a significant impact on the clarity of the outputted seismic section. Thus, it is preferable that the seismic data utilized with the inventive method be pre-processed to filter or attenuate noise. Standard noise reduction techniques known in the art include tau-p filtering, Karhuenen-Loeve filtering, FK filtering, slant-stack filtering, etc. FIG. 6 illustrates the difference between seismic data that has been noise filtered, shown at 126, and seismic data that has not been noise filtered, shown at 128.

Figure 7:
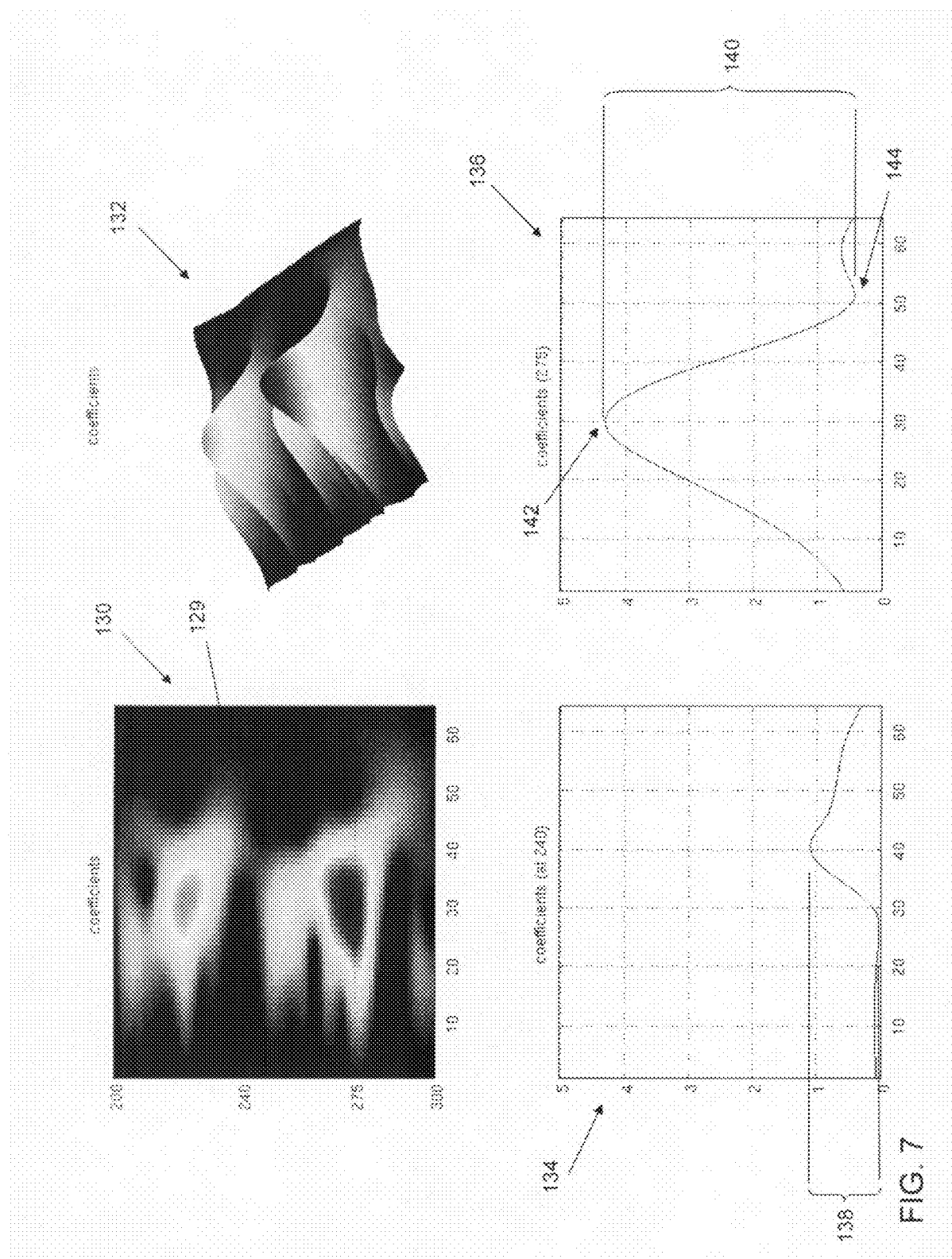
FIG. 7 illustrates a plot of coefficients vs scale before log conversion.
Figure 8:
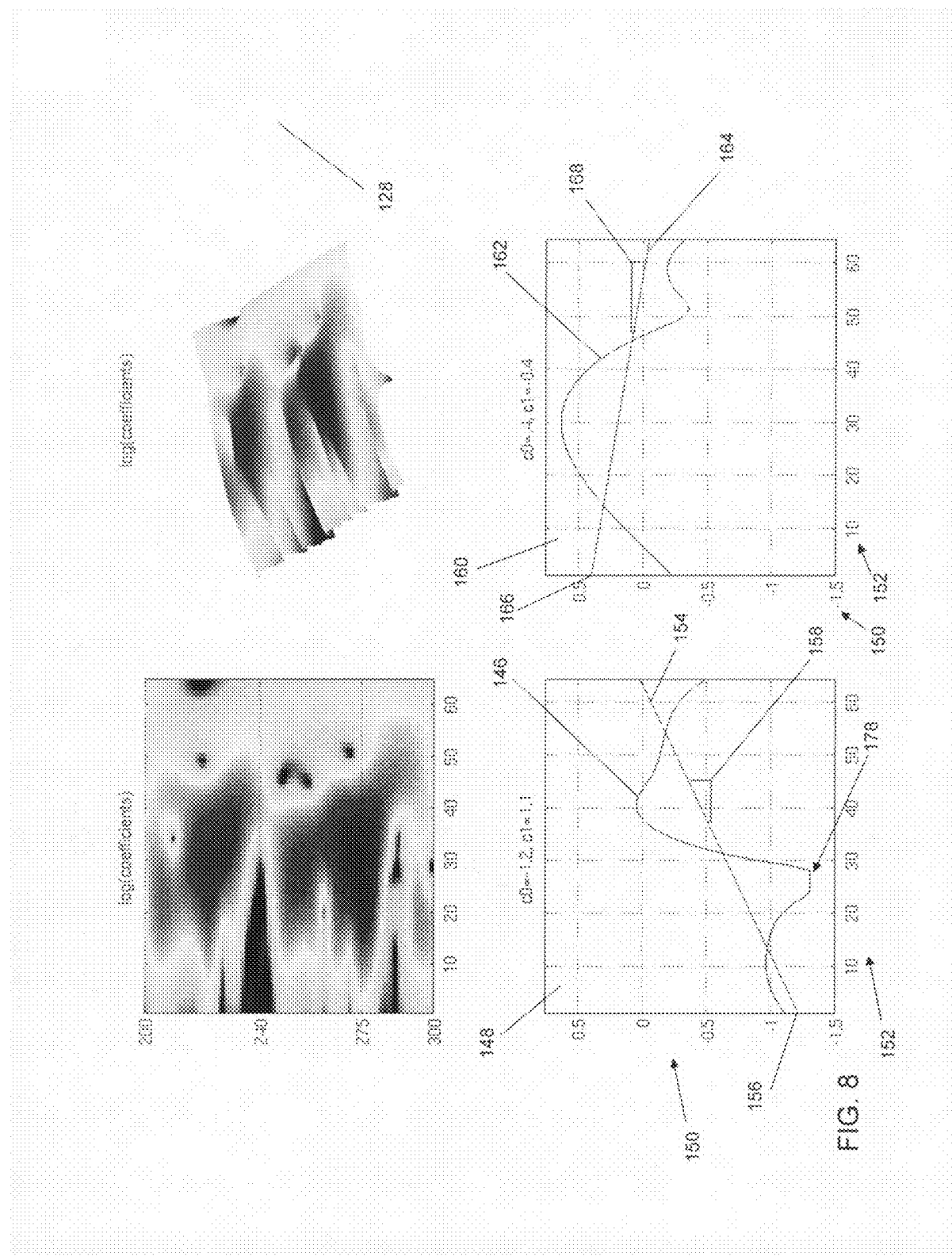
FIG. 8 illustrates wavelet transforms plotted on a log-log scale.

The method of the invention is illustrated more specifically with reference to FIGS. 7 and 8. In FIG. 7, a seismic trace 129 is illustrated in a 2D, time-depth plot 130 and also in 3D plot 132. Energy associated with the trace is investigated at the time indices 240 and 275 by plotting the amplitude, as is shown in plots 134 and 136, respectively. It should be noted that the foregoing plots are linear, before any log has been applied. As can be seen, the amplitude at 240 remains fairly small (see 138), while the amplitude at 275 has a comparatively large variance (see 140) between the maximum 142 and minimum 144 values. In order to extract meaningful data from the foregoing, a wavelet transform is applied to the data as described herein.

Figure 5:
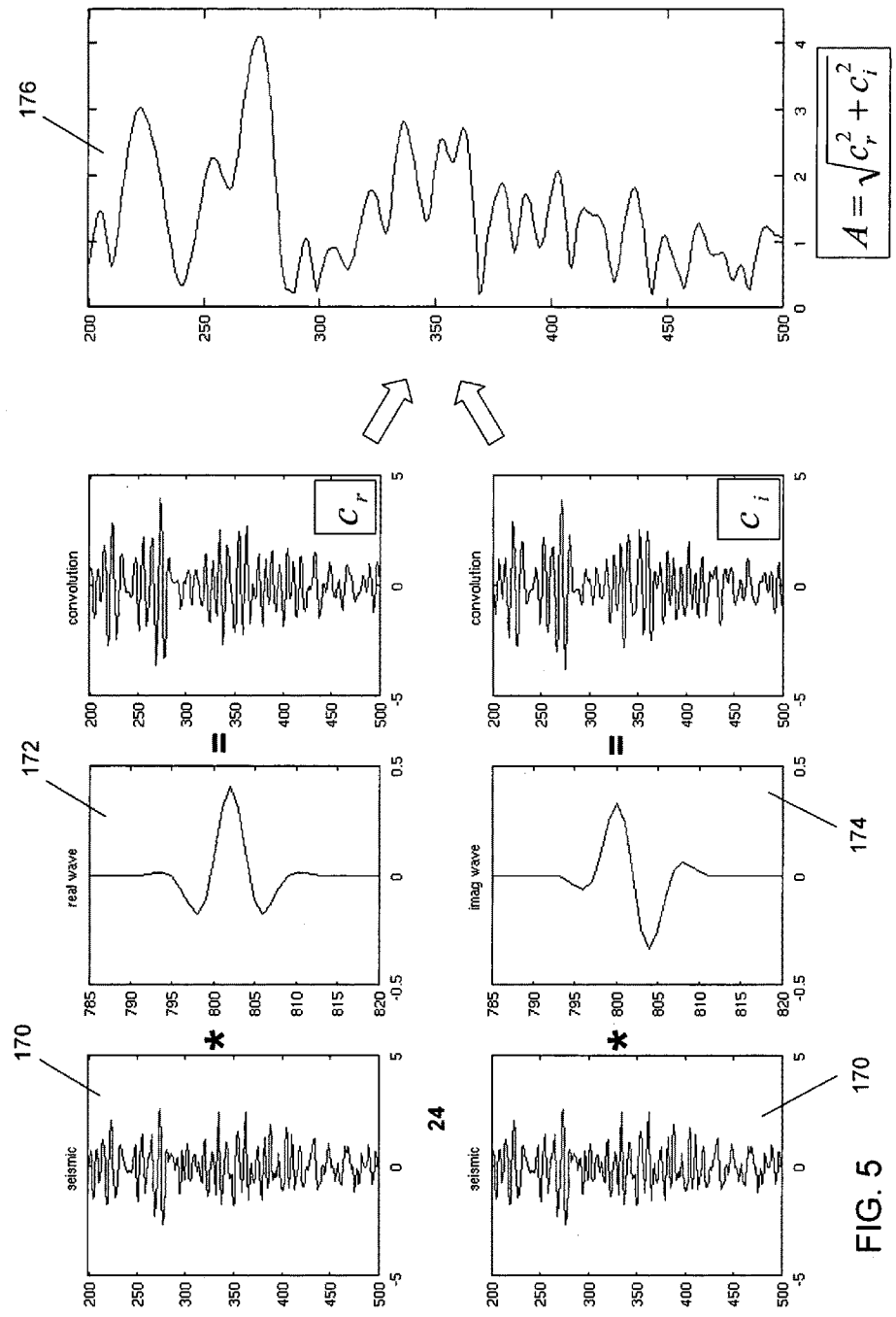
FIG. 5 illustrates the convolution of a seismic trace with both the real and the imaginary parts of a Morlet wavelet.

In FIG. 8, the wavelet transform 146 (determined above in step 18) at the time index 240 is plotted in log-log space 148. The two axes for the log-log scale are wavelet transform amplitude 150 and scale 152. A least squares linear fit line 154 is plotted in the log-log space over a range of scale values determined to be the most representative of the seismic data spectrum. As mentioned above, the scale is selected to maximize accurate output. For each scale in the range, the trace is convolved with the real and imaginary parts (see FIG. 5 illustration) to obtain an estimate of the degree of similarity of the trace with the complex Morlet wavelet. This continues until all the scales within the determined range that are chosen to go into the calculations have been used. In one preferred embodiment, for example, the scale range corresponding to a 10-50 Hz range is selected (see FIG. 3, sections 122 and 124).

In any event, the least squares linear fit line 154 can be characterized by an intercept 156 and gradient 158. The gradient 158 is the Hölder exponent, which, for purposes of the invention described herein, is discarded. The intercept 156 has unexpectedly been determined to be much more stable and hence it is used as the output of the present invention. In log log space 160, the wavelet transform 162 at the time index 275 is plotted at a different time or depth, and hence a least squares fit line 164 has a different intercept 166 and gradient 168. The preferred embodiment goes sample by sample down the seismic trace calculating an intercept, as in FIG. 8, plots 148 and 160, at every desired time or depth sample point for every trace. The time sample interval, i.e. 2 ms, 4 ms, etc., is selected as desired. The same applies to depth samples.

Those skilled in the art will appreciate that each wavelet transform, such as 146, 162, will be "stretched" or "squeezed" in the time or depth domain depending on the selected scale. The wavelet transform plotted in the log log space represents the similarity between the chosen wavelet, in this case the Morlet wavelet, with its varying scale, and the seismic trace (see FIG. 7, seismic trace 129 and FIG. 5, trace 170 for illustration) on a point by point basis in time or depth using convolution.

In FIG. 5, a seismic trace 170 is shown. The associated wavelet, in this case the Morlet wavelet, has real (Re) 172 and imaginary (Im) 174 parts. This plot only pertains to one scale at one time or depth sample. The trace is convolved with the real 172 and imaginary 174 parts to obtain an estimate of the degree of similarity 176 of the trace with the complex Morlet wavelet at a particular scale.

More specifically, the complex Morlet wavelet, with both real 172 and imaginary 174 parts, can be characterized by the following equation in order to obtain the log-log plots and intercepts:

$$A(s_n) = [a(U*Re(s_n))^2 + (2-a)(U*Im(s_n))^2]^{1/2} \qquad 1)$$

$$A(s_n) = [(a)re(s_n)^2 + (2-a)im(s_n)^2]^{1/2} \qquad 2)$$

where U=the seismic trace $S_n$ is the particular scale value, $Re(s_n)$=the real part of the Morlet wavelet, $Im(s_n)$=the imaginary part of the Morlet wavelet, $A(s_n)$=the amplitude value associated with the scale value $s_n$, $re(s_n) = U*R(s_n)$, $im(s_n) = U*I(s_n)$, a=user supplied "weight" parameter, and

* means convolution.

Here "a" is the weighted value mentioned above that determines what fraction of the Morlet wavelet is taken from the real part 172 and what fraction of the Morlet wavelet is taken from the imaginary part 174 generated by the convolution of the wavelet and the seismic trace. There will be one such "a" value for all time points and all traces, i.e. 2 ms, 4 ms, etc. This "a" value has an effect on the wavelet transform and thus on the intercept 156, 166 and the gradient 158, 168. The parameter "a" is determined visually by looking at test results with different values of "a."

Figure 18:
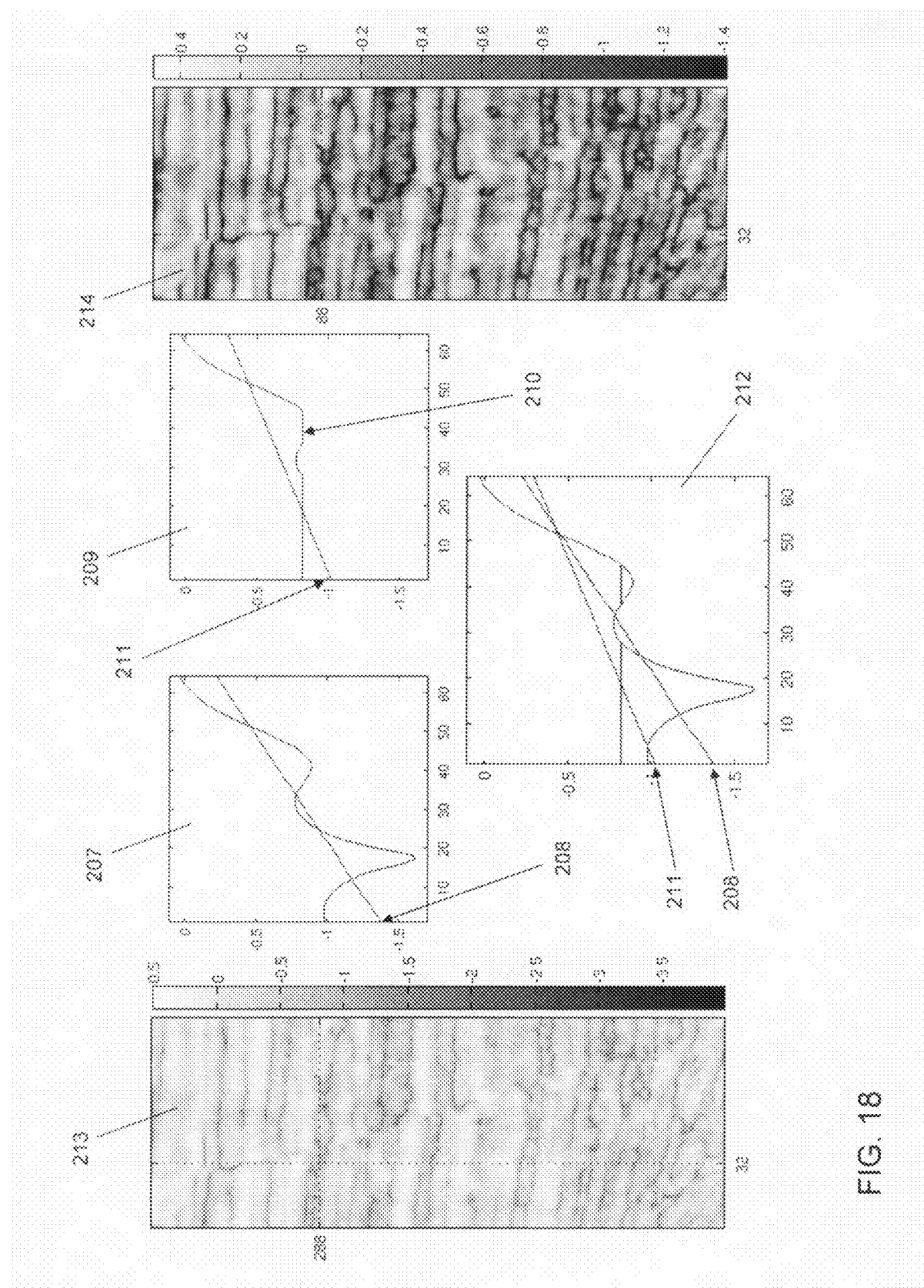
FIG. 18 illustrates the effects of damping on seismic output section generated utilizing the intercept attribute of the invention.

As described above, the intercept values, such as 156, 166, across a range of wavelet transform amplitudes for a particular time becomes the output to the particular time value. FIGS. 2 and 3 illustrate the effect of the method of the invention on wavelet based output. More particularly, FIG. 2 illustrates seismic data processed with wavelet based techniques of the prior art, such as methods that utilize Hölder exponents, while FIG. 3 illustrates the same seismic data processed with a wavelet based technique and utilizing the intercept as the attribute. As is evident by comparing the seismic sections of the two Figures, the utilization of the intercept attribute results in output that is much improved and stabilized over the prior art attributes. A noise floor was placed on the wavelet transform amplitude spectrum shown in FIG. 3 to avoid instability. This noise floor is best illustrated in FIG. 8, plot 148 at 178, and also in FIG. 18. FIG. 18 shows the effects of damping on the input section. Specifically, section 207 illustrates a least squares line generated from a wavelet transform for seismic data at a single point. Damping has not been applied to section 207. The intercept of the wavelet transform for section 207 is shown at 208. In comparison, in section 209 a floor 210 has been applied to the wavelet transform, thus resulting in a least squares line with a different intercept 211. The effects of damping on the intercept are best seen in the combination section 212 where the intercepts with and without damping are shown on the plot. It can be appreciated that by attenuating noise below a selected floor, the resulting intercept better characterizes the primary seismic signal.

Resulting seismic sections generated from sections 207 and 209 are shown as sections 212 and 213, respectively. As is evident, damping has the effect on the output seismic section 213 of increasing contrast over the non-damped output seismic section 212.

FIG. 2 illustrates intercept trace sections or volumes derived using the Holder exponent. In section 110, the Holder exponent was calculated across a frequency range from 1-100 Hz, while in section 112, the lower end of the foregoing frequency range was attenuated (the range being 10-100 Hz) and in section 114, the upper end of the frequency range was then attenuated (the range being 10-50 Hz). As is evident particularly in section 110, low frequency wavelets tend to respond to large scale noise, resulting in the streaking shown in section 110. The structure and stratigraphy become more apparent across the sections as the scale range is adjusted to the desired frequency. Section 116 illustrates a section similar to section 114, but where pre-processing noise attenuation was applied prior to wavelet transform.

The same seismic data processed in FIG. 2 to yield the sections shown therein was also processed utilizing the method of the invention, namely the intercept to yield the sections shown in FIG. 3. While the same ranges and pre-processing noise attenuation was applied in the case of each section, the finer results in each case can clearly be seen. Section 118 was calculated across a frequency range from 1-100 Hz, while in section 120, the lower end of the foregoing frequency range was attenuated (the range being 10-100 Hz) and in section 122, the upper end of the frequency range was then attenuated (the range being 10-50 Hz). Section 124 illustrates a section similar to section 122 subject to pre-processing noise attenuation. Thus, with reference to both FIGS. 2 and 3, comparison of sections 116 and 124 illustrates the very dramatic effects that the method of the invention has on processing over the prior art. This is shown as an increase in the reflector definition below 400.

Figure 9:
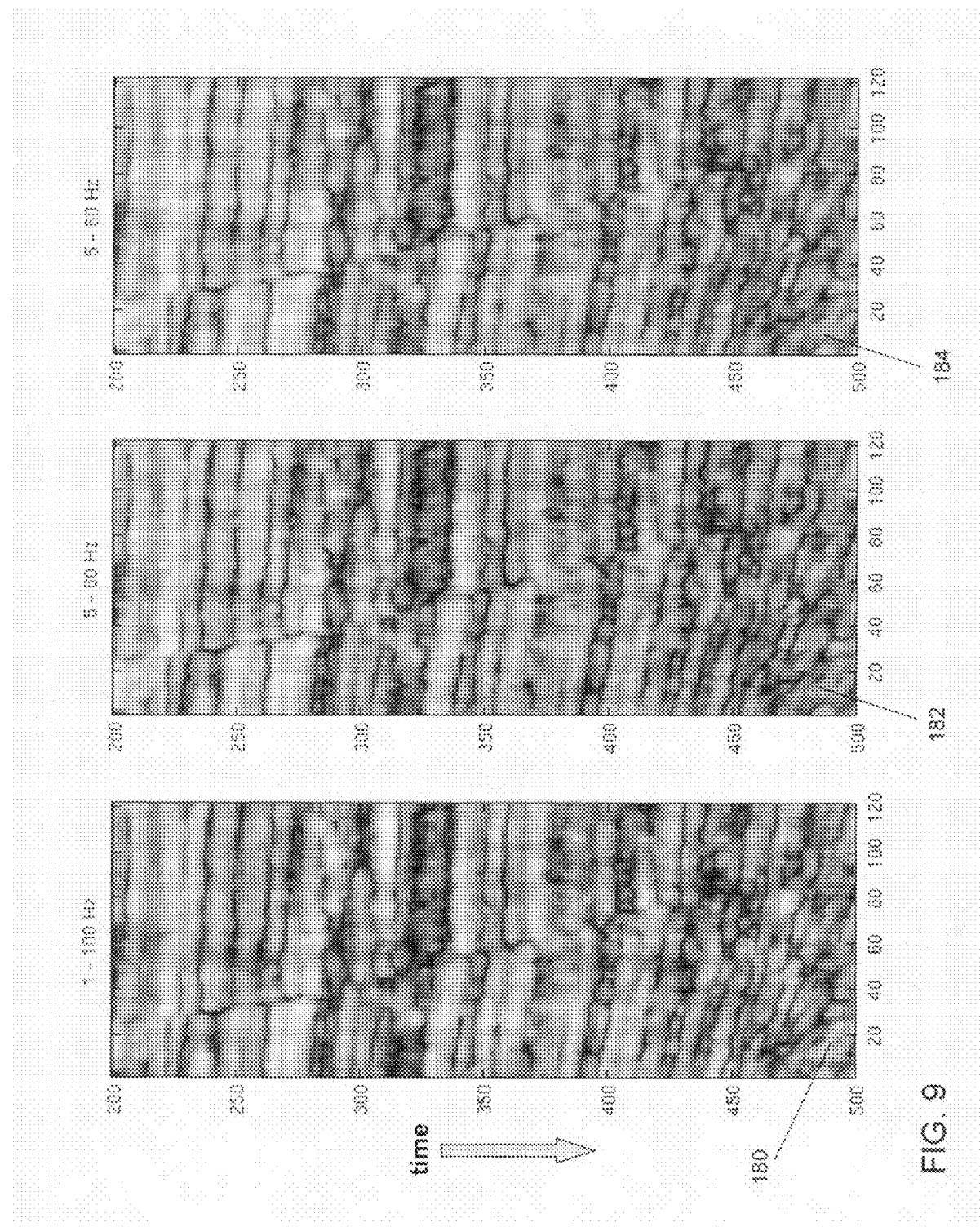
FIG. 9 shows three seismic sections with different ranges which have been subjected to pre-processing noise removal.

One interesting thing to note, as shown more particularly in FIG. 9, is that frequency limits tend to have less of a noticeable effect on the section 180 when pre-processing noise attenuation was utilized (as compared to section 118).

Figure 12:
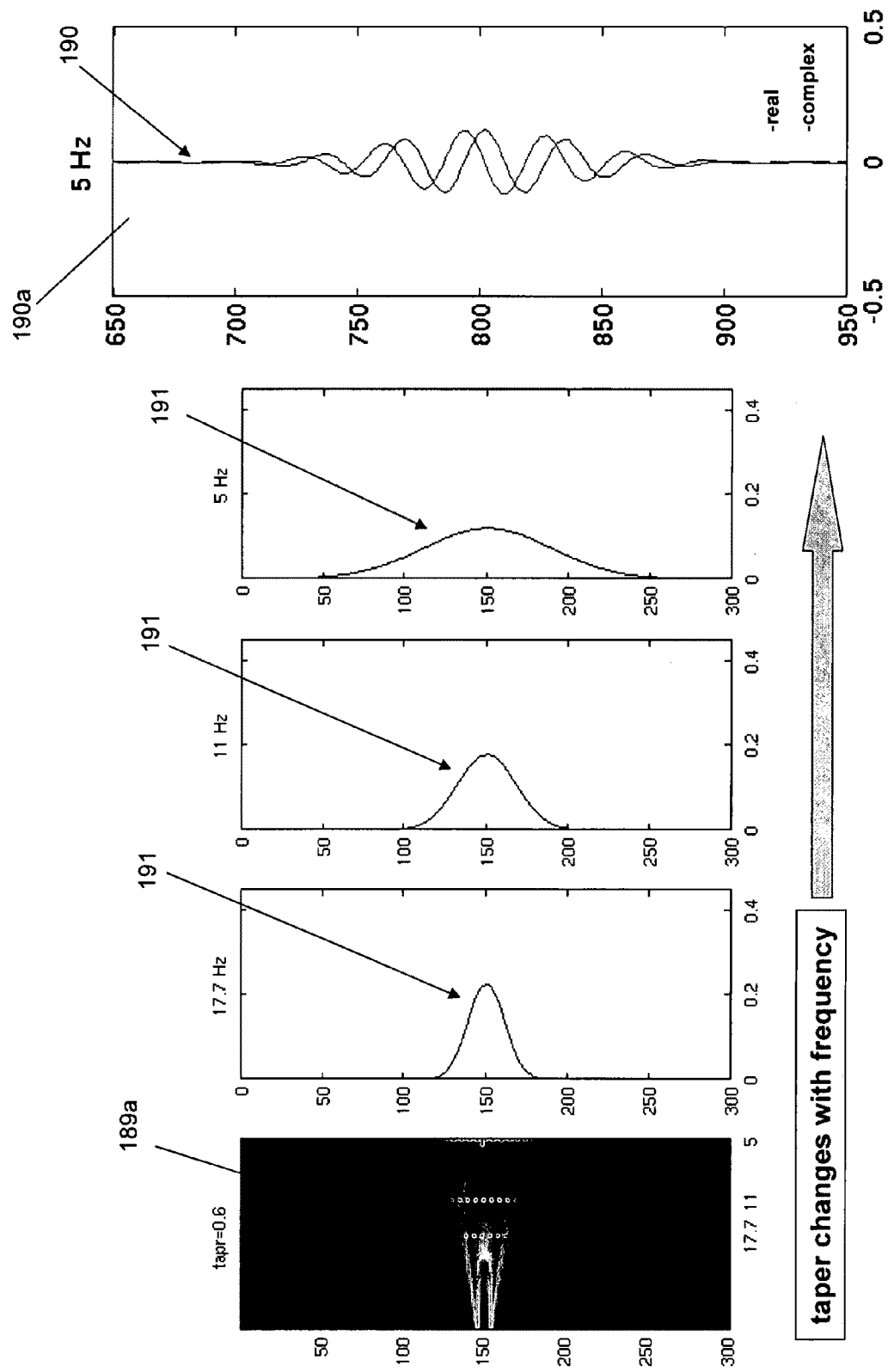
FIG. 12 illustrates the effect of taper of amplitude 0.6 on a wavelet.
Figure 13:
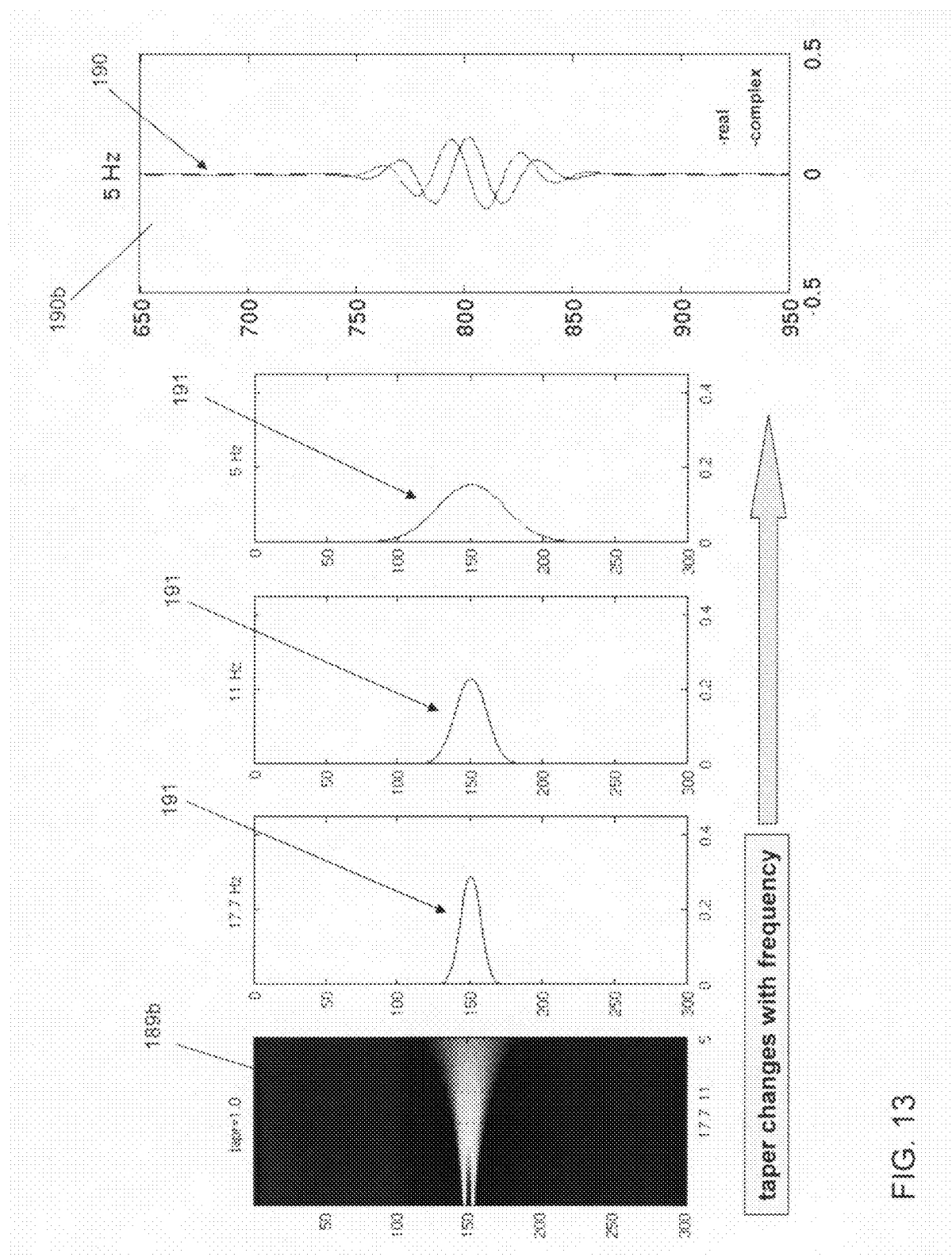
FIG. 13 illustrates the effect of taper of amplitude 1.0 on a wavelet.

With respect to taper, the Morelet wavelet is a Gaussian taper over a sinusoidal function. The Gaussian controls how many oscillations are in the wavelet. Taper controls how fast the sinusoid dies off. In application to the invention, it is a parameter control over how fast Gaussian decays. The taper number is determined visually and determines the resolving power of the wavelets. FIGS. 12-13 show the effect of different tapers on a wavelet. Specifically, in FIG. 12, a taper of 0.6 is applied to a wavelet, while in FIG. 13, a taper of 1.0 is applied to the same wavelet. The wavelet resolution 189 can be seen in a comparison of the wavelet resolution 189a for a taper of 0.6 and wavelet resolution 189b for a taper of 1.0. The difference in tapers on a single wavelet 190 is shown in 190a (single wavelet at 0.6 taper) and 190b (single wavelet at 1.0 taper.) Likewise, the effects of taper on a wavelet at varying frequencies is shown in FIGS. 12 and 13. Specifically, wavelet 191 is shown in FIG. 12 at frequencies of 17.7 Hz, 11 Hz and 5 Hz, all with a 0.6 taper, while wavelet 191 is shown in FIG. 13 at frequencies of 17.7 Hz, 11 Hz and 5 Hz, all with a 1.0 taper. As is evident, the higher the value of the taper, the faster the amplitude reduces.

Figure 14:
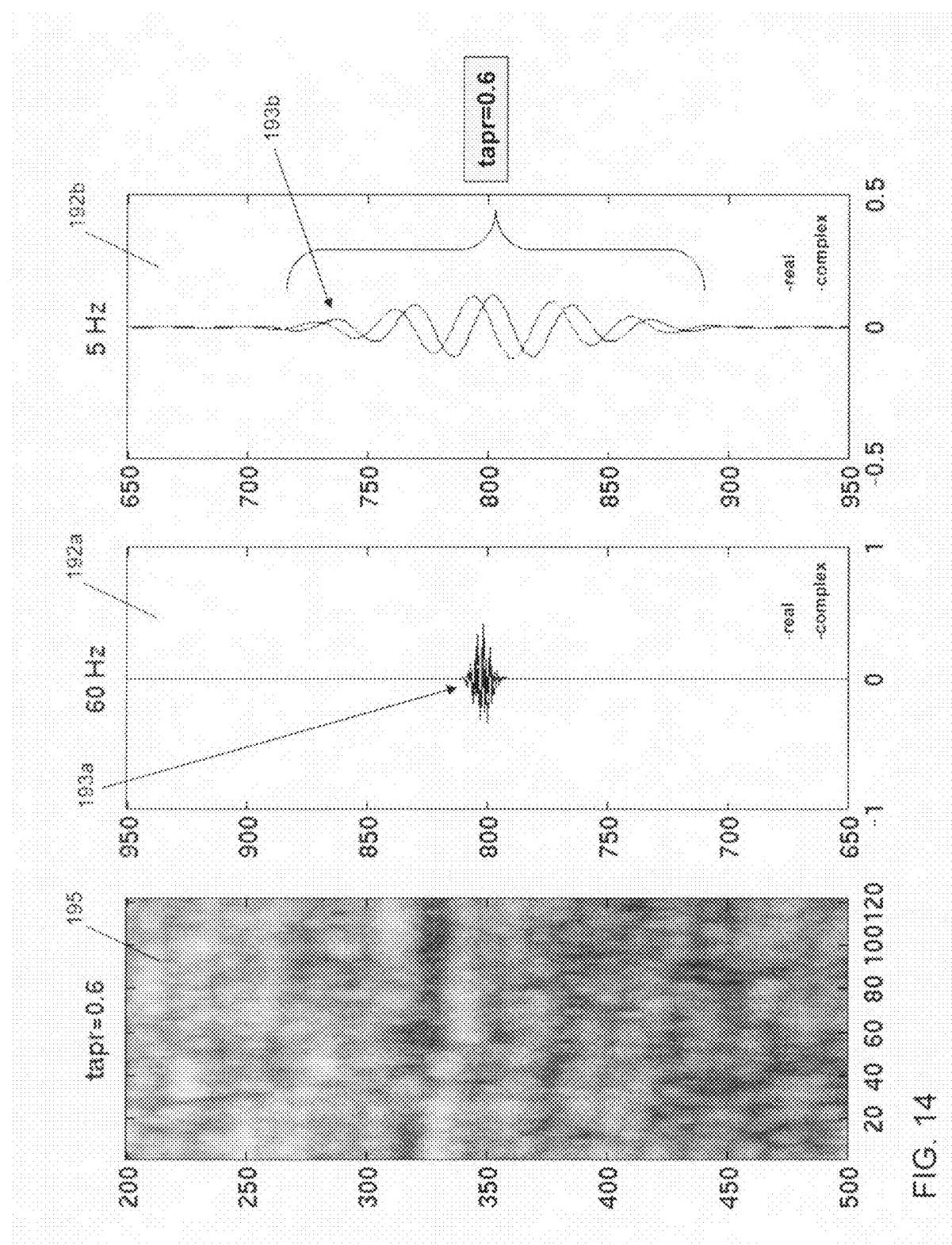
FIG. 14 illustrates the effect of taper of amplitude 0.6 on a seismic output section generated utilizing the intercept attribute of the invention.
Figure 15:
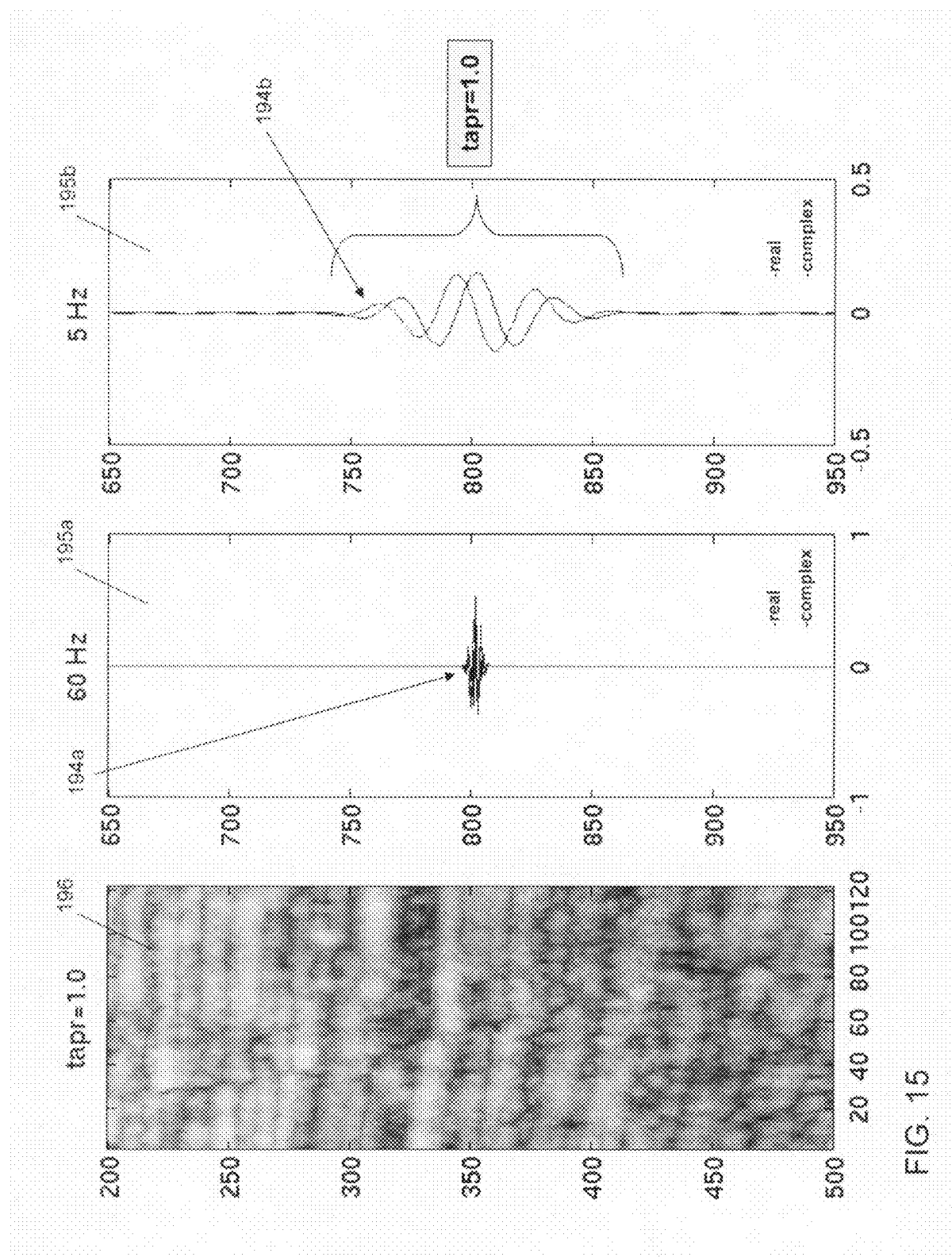
FIG. 15 illustrates the effect of taper of amplitude 1.0 on a seismic output section generated utilizing the intercept attribute of the invention.

FIGS. 14-15 show the effects of the tapers 0.6 and 1.0 on the output generated from use of the intercepts of the invention. Specifically, in FIG. 14, a 0.6 taper has been applied to a wavelet, while in FIG. 15, a taper of 1.0 has been applied to the same wavelet. In the case of sections 192a (the output at 60 Hz) and 192b (the output at 5 Hz) shown in FIG. 14, it can be seen that the output sections have greater side lobes, as at 193a and 193b, than the side lobes 194a and 194b of sections 195a (the output at 60 Hz) and 195b (the output at 5 Hz) of FIG. 15. In this case, the larger taper yields a sharper output image section as seen in the comparison of section 195 of FIG. 14 and section 196 of FIG. 15.

Figure 17:
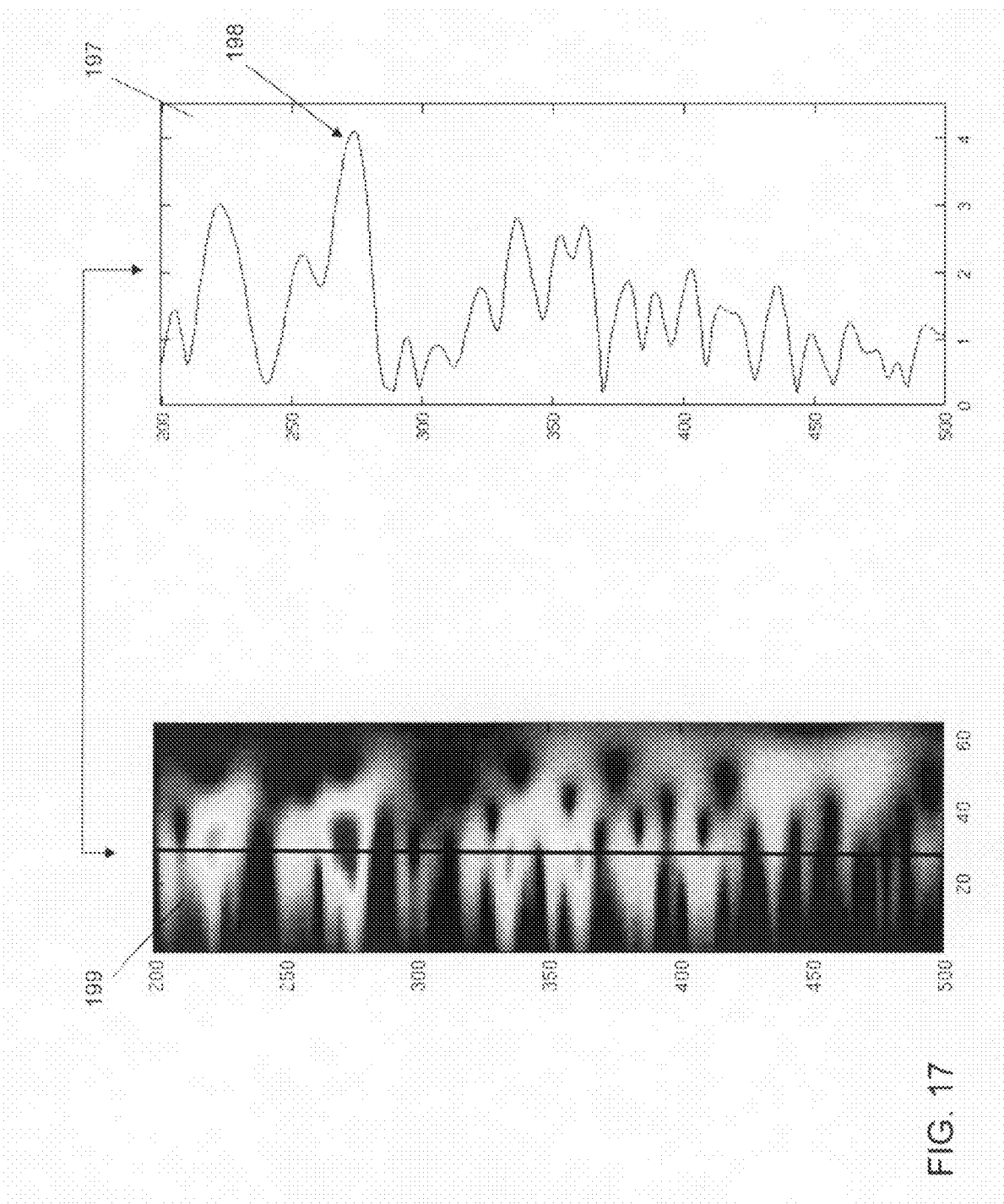
FIG. 17 illustrates the amplitude resulting from convolution with a single wavelet and the amplitude spectrum resulting from convolution of all wavelets in the suite.

As mentioned above, a single trace is convolved with all wavelets to obtain an amplitude spectrum. Shown in FIG. 17 at section 197 is convolution with a single wavelet 198, where the amplitude of the single wavelet 198 can be easily discerned. This amplitude is extracted and the convolution process is repeated for all wavelets in the suite to produce an amplitude spectrum 199 for the suite of wavelets.

Figure 16:
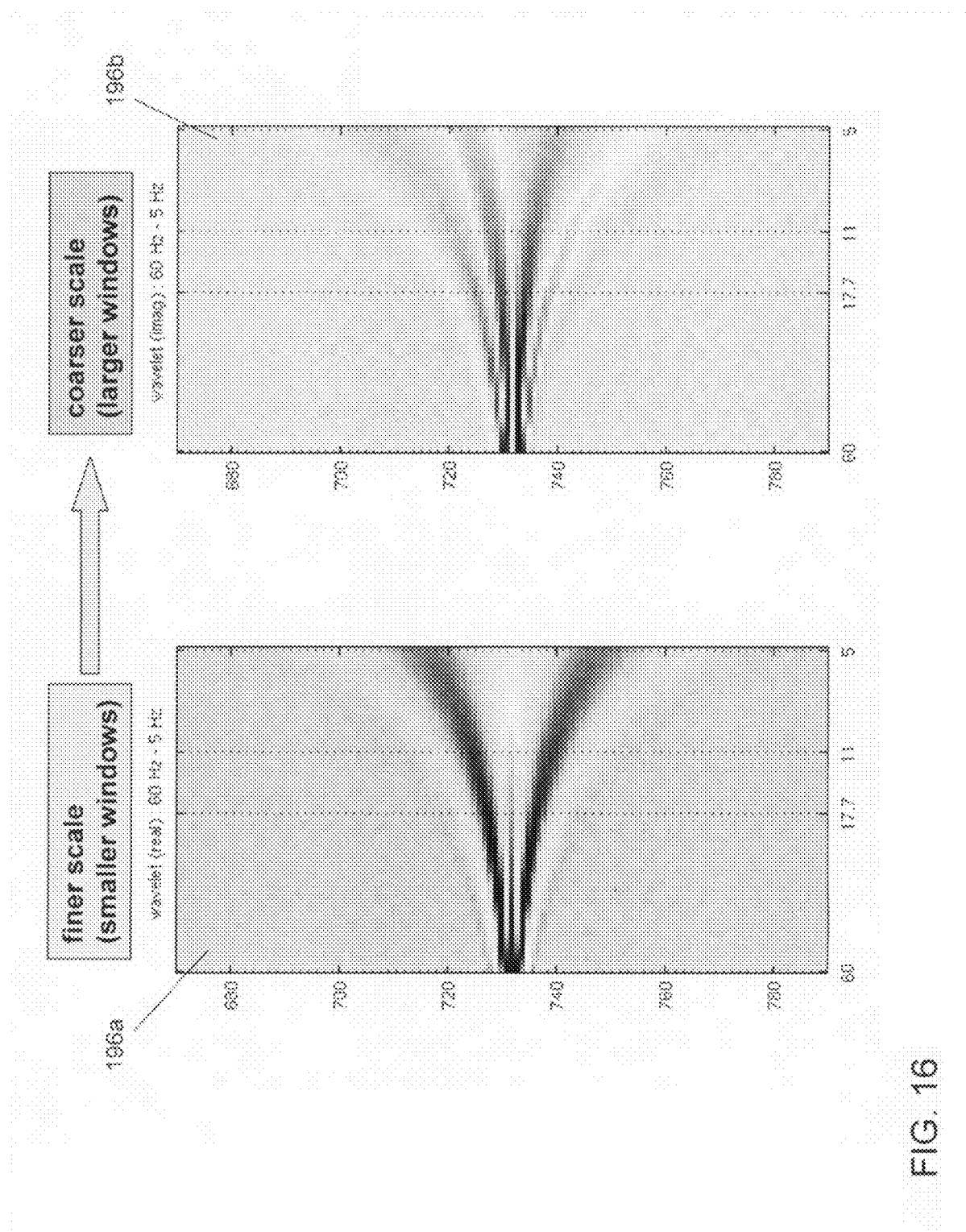
FIG. 16 illustrates a suite of wavelets with a frequency range of 5 Hz to 60 Hz.

In summary, in the preferred embodiment, seismic data is pre-processed to attenuate noise. Then the wavelets are built by selecting a scale range for the wavelets, computing the wavelets on a non-linear plot (such as a log log plot), apportioning the wavelets into their real and imaginary parts, and convolving the wavelets with each trace. It should be noted that high frequency wavelets respond best to fine scale events, while low frequency wavelets respond best to coarse scale events and thus the scale range should be selected accordingly. Preferably, the wavelets are built to have equal energy across scale bands for the real and imaginary parts. In this way, the wavelets will have the same shape, but different durations and amplitudes. While the wavelet may be "squeezed" and "stretched", the original energy is preserved. Next a taper is chosen and applied. A taper is chosen visually and determines the resolving power of the wavelets. The taper is frequency dependent and determines the extent of the side lobes. The higher the value of the taper, the faster amplitudes reduce. Wavelets at different scales yield a suite of wavelets, which wavelets are convolved with the data. In other words, at one frequency, the real and imaginary parts of the wavelet are convolved with a single seismic trace to yield an amplitude for a single wavelet. This is done for all wavelets to obtain an amplitude spectrum. In FIG. 16, a typical suite of wavelets with a chosen range of frequencies and a chosen taper is shown. Specifically, once a suite of wavelets is built the wavelets are convolved with the data using the real and imaginary portions of the wavelet. As mentioned above, in the prior art, transforms such as Fourier transforms, short-time FFT's and Gabor transforms all use one window length for all frequencies. However, as part of the instant invention, varying size windows are utilized. In the case of the wavelets shown in section 196a and 196b, the wavelets are different because the window associated with each wavelet is scale (frequency) dependent. A finer scale, meaning a smaller window, yields section 196a, while a coarser scale, meaning a larger window, yields section 196b. After the log of the amplitude range and the log of the scale range are computed, regression is performed across the frequency or scale range for each trace. The intercepts are obtained from the regressions.

Figure 10:
FIG. 10 provides a time slice at approximately 1.5 seconds of a seismic section derived utilizing the invention.

FIG. 10 illustrates an invention time slice at approximately 1.5 seconds, illustrating how the inventive method applied along a horizon reveals a geology. Here, the time slice from a 3D volume flattened at a horizontal interpreted at approximately 1.5 seconds. This slice shows a number of detailed channel and fault features and outlines the edge of a broad channel at the northeast of the area. Those skilled in the art will appreciate that the foregoing is a very good resolution of the geology.

What is claimed is:
1. A wavelet-based method for analysis of seismic data comprising:
   acquiring a plurality of seismic traces;

applying a wavelet transform to said plurality of seismic traces, said wavelet transform having a basis wavelet and producing wavelet coefficients for localized scales and localized time or depth points; and calculating an intercept by regression for at least one of said localized time or depth points, wherein said intercept is used to form images of the subsurface.

2. The method of claim 1 wherein said basis wavelet is selected from the group consisting of a Harr wavelet, a Morlet wavelet, a Ricker wavelet or a Daubechies wavelet.

3. The method of claim 1 wherein said at least one seismic trace has undergone any stage of seismic data processing including raw field data to final migrated data.

4. The method of claim 2 wherein said basis wavelet is said Morlet wavelet.

5. The method of claim 1 wherein said wavelet transform is selected from the group consisting of a continuous wavelet transform, a dyadic wavelet transform, a discreet wavelet transform or a fast wavelet transform.

6. The method of claim 1 wherein said calculating an intercept by regression for at least one localized time or depth point comprises performing a least squares linear regression upon a log-log plot of said wavelet coefficients at said localized scales.

7. The method of claim 1 further comprising choosing an appropriate range of scales in order to improve the fit of said intercept by regression prior to performing said regression.

8. The method of claim 1 wherein said calculating an intercept for at least one localized time or depth point comprises calculating intercepts for a plurality of localized time points.

9. The method of claim 8 further comprising forming an intercept trace from the intercepts for a plurality of localized time or depth points.

10. A method for analysis of seismic trace data comprising:
performing a continuous wavelet transform on a seismic trace, said transform producing wavelet coefficients across a range of scales for each localized time point;
calculating the intercept across a range of scales for each localized time or depth point of said transform by a regression means, thereby producing an intercept trace; and
applying image processing to the intercept trace, thereby producing an intercept trace section.

11. The method of claim 10 wherein said seismic trace has undergone data processing comprising at least one of deconvolution, NMO, migration and stacking.

12. The method of claim 10 wherein said continuous wavelet transform comprises a basis wavelet and said basis wavelet is a Morlet wavelet.

13. The method of claim 10 wherein said regression means comprises a least-squares linear regression of a log-log plot.

14. The method of claim 1 wherein said wavelet transform comprises a weighted sum of real and imaginary parts of the wavelet transform.

15. The method of claim 14, wherein the real and the imaginary parts of the wavelet transform are weighted differently.

16. The method of claim 1, further comprising the step of establishing a noise floor for the wavelet transform.

17. The method of claim 10 wherein said wavelet transform comprises a weighted sum of real and imaginary parts of the wavelet transform.

18. The method of claim 17, wherein the real and imaginary parts of the wavelet transform are weighted differently.

19. The method of claim 10, further comprising the step of establishing a noise floor for the wavelet transform.

20. A method of processing seismic data, said method comprising:
providing original seismic signal data;
putting said seismic data through preprocessing;
putting said seismic data through a wavelet transform;
determining the intercept; and
using the characteristics of the intercept function to create an output value.

21. The method of claim 1 wherein the wavelet used is the Morlet wavelet.

22. The method of claim 1 wherein the wavelet is the Daubechies wavelet.

23. The method of claim 1 wherein a weighted sum of real and imaginary parts of the wavelet transform is generated.

24. The method of claim 1 wherein a noise floor is established for the wavelet transform.

25. The method of claim 20, wherein the preprocessing is to attenuate noise.

26. A wavelet based method for analysis of seismic data comprising:
acquiring at least one seismic trace;
applying a wavelet transform to said at least one seismic trace, said wavelet transform having a basis wavelet and producing wavelet coefficients for localized scales and localized time or depth points;
calculating intercepts by regression for a plurality of localized time or depth points; and
forming an intercept trace from the intercepts for a plurality of localized time or depth points.

* * * * *